United States Patent
Lindenmeier et al.

(10) Patent No.: US 6,611,677 B1
(45) Date of Patent: *Aug. 26, 2003

(54) SCANNING DIVERSITY ANTENNA SYSTEM FOR MOTOR VEHICLES

(75) Inventors: Heinz Lindenmeier, Planegg (DE); Jochen Hopf, Haar (DE); Leopold Reiter, Gilching (DE)

(73) Assignee: Fuba Automotive GmbH & Co., KG, Bad Salzdetfurth (DE)

(*) Notice: Subject to any disclaimer, the term of this patent is extended or adjusted under 35 U.S.C. 154(b) by 0 days.

This patent is subject to a terminal disclaimer.

(21) Appl. No.: 09/465,184

(22) Filed: Dec. 15, 1999

(30) Foreign Application Priority Data

Dec. 17, 1998 (DE) .......................... 198 58 465

(51) Int. Cl.⁷ .............................................. H04B 17/00
(52) U.S. Cl. ................. 455/135; 455/226.1; 455/277.1; 455/277.2
(58) Field of Search .......................... 455/277.1, 277.2, 455/345, 226.1, 226.2, 226.3, 67.1, 132, 133, 134, 135

(56) References Cited

U.S. PATENT DOCUMENTS

| | | | |
|---|---|---|---|
| 4,752,968 A | 6/1988 | Lindenmeier et al. | |
| 5,710,995 A * | 1/1998 | Akaiwa et al. | 455/277.2 |
| 5,826,179 A * | 10/1998 | Lindenmeier et al. | 455/277.2 |
| 6,011,962 A * | 1/2000 | Lindenmeier et al. | 455/226.1 |
| 6,188,879 B1 * | 2/2001 | Imamura | 455/277.1 |
| 6,275,712 B1 * | 8/2001 | Gray et al. | 455/522 |
| 6,278,869 B1 * | 8/2001 | Lindenmeier et al. | 455/277.1 |
| 6,330,433 B1 * | 12/2001 | Jager | 455/277.2 |
| 6,430,404 B1 * | 8/2002 | Lindenmeier et al. | 455/132 |

FOREIGN PATENT DOCUMENTS

DE 44 03 612 8/1995

* cited by examiner

Primary Examiner—Thanh Cong Le
Assistant Examiner—Tanmay Lele
(74) Attorney, Agent, or Firm—Collard & Roe, PCC.

(57) ABSTRACT

A scanning antenna diversity system for motor vehicles having at least two antennas mounted in a multi-antenna installation, and connected to a switching logic circuit. The circuit has discrete switching positions, and a reversing position USmax. A receiver is coupled to logic circuitry for receiving a RF signal from one of switching positions or reversing position USmax. There is a diversity processor coupled to and controlled by receiver for producing a derived received signal from the RF signal, with diversity processor cyclically stepping the logic circuitry to another switching position during the presence of receiver interference. There is a maximum level indicator having its input coupled to the antennas, and having its output connected to the controllable logic circuitry for sensing the strongest actual levels of the antenna signals. Level indicator 39 continuously compares the received signals at antennas and activates the logic switching circuit in response to any interference.

13 Claims, 7 Drawing Sheets

SCANNING DIVERSITY ANTENNA SYSTEM FOR MOTOR VEHICLES

BACKGROUND OF THE INVENTION

1. Field of the Invention

This invention relates to a scanning antenna diversity system for vehicles having a multi-antenna installation.

2. The Prior Art

Circuit arrangements for antenna diversity systems are known from U.S. Pat. No. 4,752,968. With an antenna diversity receiving system for eliminating interference in frequency-modulated (FM) radio transmissions, a diversity processor is provided with a number of antenna signals, wherein a selected antenna signal is switched through to the receiver at each interval in time. From this received signal, a signal is derived in the intermediate frequency (IF) range of the receiver by conversion and coupled to the diversity processor for interference detection. When an interference is detected, switching signals are derived in the diversity processor for reversing to another antenna signal. Therefore, audio frequency interference caused by multichannel reception is largely avoided if adequate reception conditions are present.

However, in areas having poor reception conditions, U.S. Pat. No. 4,752,968 discloses circuit arrangements which have frequent reversing or switchover processes. These circuit arrangements have interference caused by such changeovers, particularly in areas where the signals are weak, and the reception quality in the motor vehicle is good. The audio quality is thus often impaired by these switchover interferences.

With frequency-modulated (FM) radio signals (for example ultra shortwave reception or television audio reception), reception interference can occur in connection with an antenna actually locked on to, the interference being caused by superimposing a plurality of partial waves with different amplitude, phase, and transmission time differences at their reception location. The level breakdowns caused by this superpositioning are correlated with frequency interference peaks, and cause signal distortions depending upon the modulation level in the audio frequency range. The minimum test time therefore corresponds with the interference detection time. If the interference detector detects interference or noise, the diversity processor induces further switching, and the further antenna signals and their linear combinations formed in an antenna matrix, if any, are all tested. If all available HF-signals show interferences, all HF-signals are continually and successively switched through to the receiver. Since this search process is repeated in rapid sequence, an audible interference signal in the form of a crackling noise is superimposed on the received signal on the low-frequency level, under special received conditions.

Therefore, measures are implemented in DE 440 03 612 in order to limit the frequency of further or continuing switching, in particularly, unfavorable receiver positions. This is accomplished, according to this patent, with the help of a stop device which prevents further switching when there is frequent interference indicated by the diversity processor, in a way that is adapted to the conditions of the reception. The interferences caused by reversing are in fact reduced by this measure. However, the reception interference indicated by the diversity processor naturally has an interference effect in the received signal.

SUMMARY OF THE INVENTION

Therefore, an object of the present invention is to provide for a scanning antenna diversity system, an apparatus which reduces further switching, and consequently the interferences and noise connected with this further switching.

In the invention, there is provided a scanning diversity antenna system for motor vehicles having a multi-antenna installation, with at least two antennas. The received voltages from the antenna signals are formed as linear combinations, and supplied to a controllable logic switching element. The received signal, which varies in terms of diversity, is switched through in different switching positions to a receiver. The receiver controls a diversity processor with a received signal derived from the varying received signals, the diversity processor cyclically switching the logic element to another switching position during reception interference. The received antenna signals are additionally supplied, to a maximum-level indicator, isolated from the signal path of the received signal, where the peak levels of the antenna signals, and thus the associated maximum-level switching position of the logic switching element are continuously determined. These determinations are carried out by a comparison of the received signal that is switched to the actual receiver, without any auxiliary modulation or the addition of any auxiliary signal. The peak level switching position is continually updated as an address signal at the output of the maximum-level indicator, and also supplied to the logic switching element. The logic switching element is designed so that in the cyclic through-switching of the received signals to the receiver, and while testing for lack of interference, a reversing position is available, in addition to the discrete switching positions of the logic switching element, for switching over to the maximum-level switching mode. The reversing position is used at least once during each cyclic pass through the switching positions. The cyclic stepping mode is interrupted, and the logic switching element continually switches the strongest signal received through to the receiver, with the help of the address signal, for the peak switching position. In the event that an interference is indicated in the diversity processor, the system reverses from the maximum-level switching mode back to the stepping mode.

The invention has the advantage that the received signal selected by the diversity processor is available at any time in the reverse position, and provides the strongest signal level due to pre-selection of the received signals so that there is low probability of interference. Therefore, the advantage is that the pre-selected received signal has an interference probability less than with the discrete signals, and thus there is a lower rate of interference detection of the diversity processor. On the other hand, in FM radio transmissions, extremely strong. interferences may occur, even with large received signals, such as during multichannel reception with large differences in transmission time, or due to interferences with an adjacent or even the same channel. Therefore, it is necessary that the selection, based on minimal interference, retains priority,and that the diversity processor also tests the maximum-level signals for freedom from interference, and, if need be, switches to a signal present in the discrete form.

Another advantage of the invention is that it is no longer necessary to invade the signal chain of the receiver connected to the loudspeakers to find the received signal with the highest level, since the available received signals are supplied to the maximum level indicator by way of the level comparator switch.

BRIEF DESCRIPTION OF THE DRAWINGS

Other objects and features of the present invention will become apparent from the following detailed description considered in connection with the accompanying drawings which disclose several embodiments of the inventions. It is to be understood, however, that the drawings are designed for the purposes of illustration only, and not as a definition of the limits of the invention.

In the drawings, wherein similar reference characters denote similar elements throughout the several views.

DETAILED DESCRIPTION OF THE PREFERRED EMBODIMENT

Figure 1A:
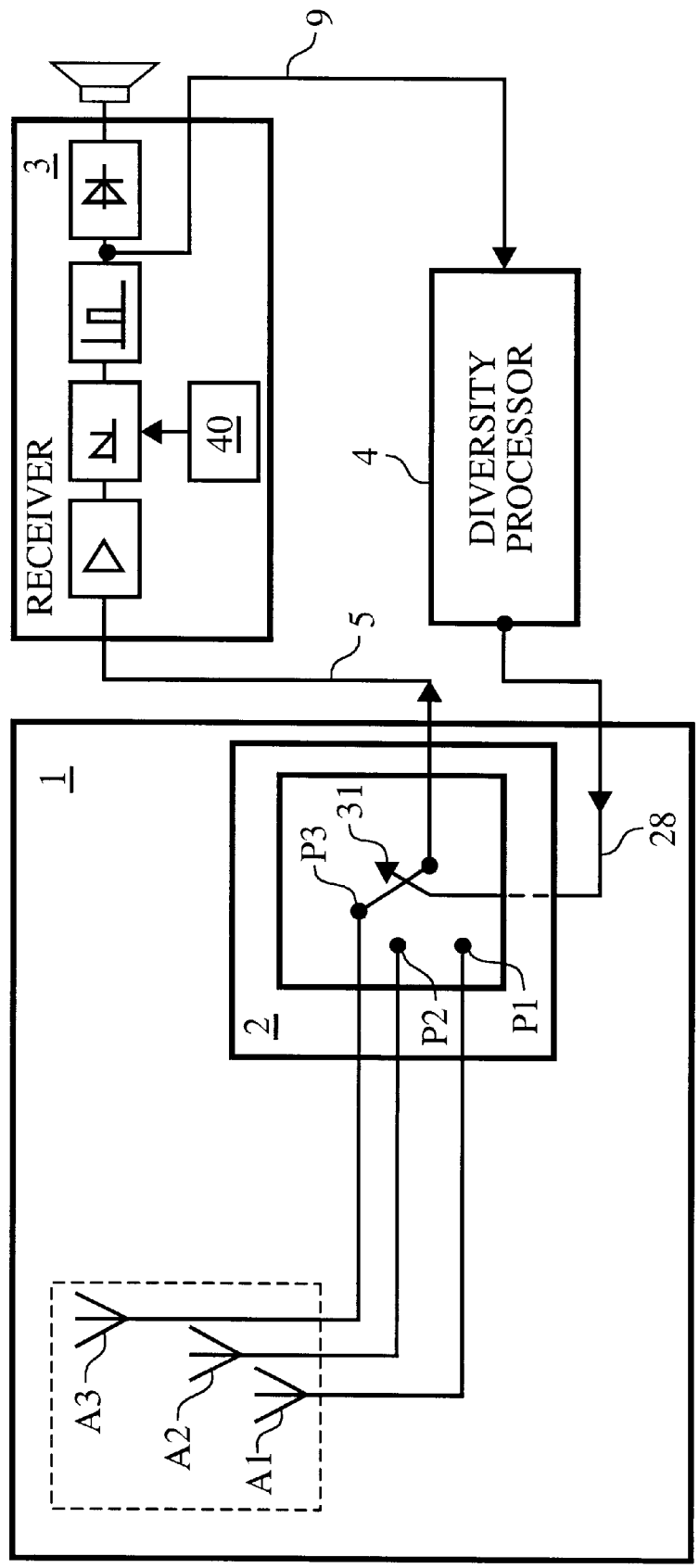
FIG. 1a shows a scanning antenna diversity system with a multi-antenna installation.

FIG. 1a shows a scanning antenna diversity system with a multi-antenna installation 1, with antennas A1, A2, and A3 connected to a switch 2, which in turn is connected to a receiver 3, and a diversity processor 4 according to the prior art. Different received signals 5 are switched to the receiver 3 by means of the stepping signals or pulses 28, by means of the cyclic stepping of switch 2.

Figure 1B:
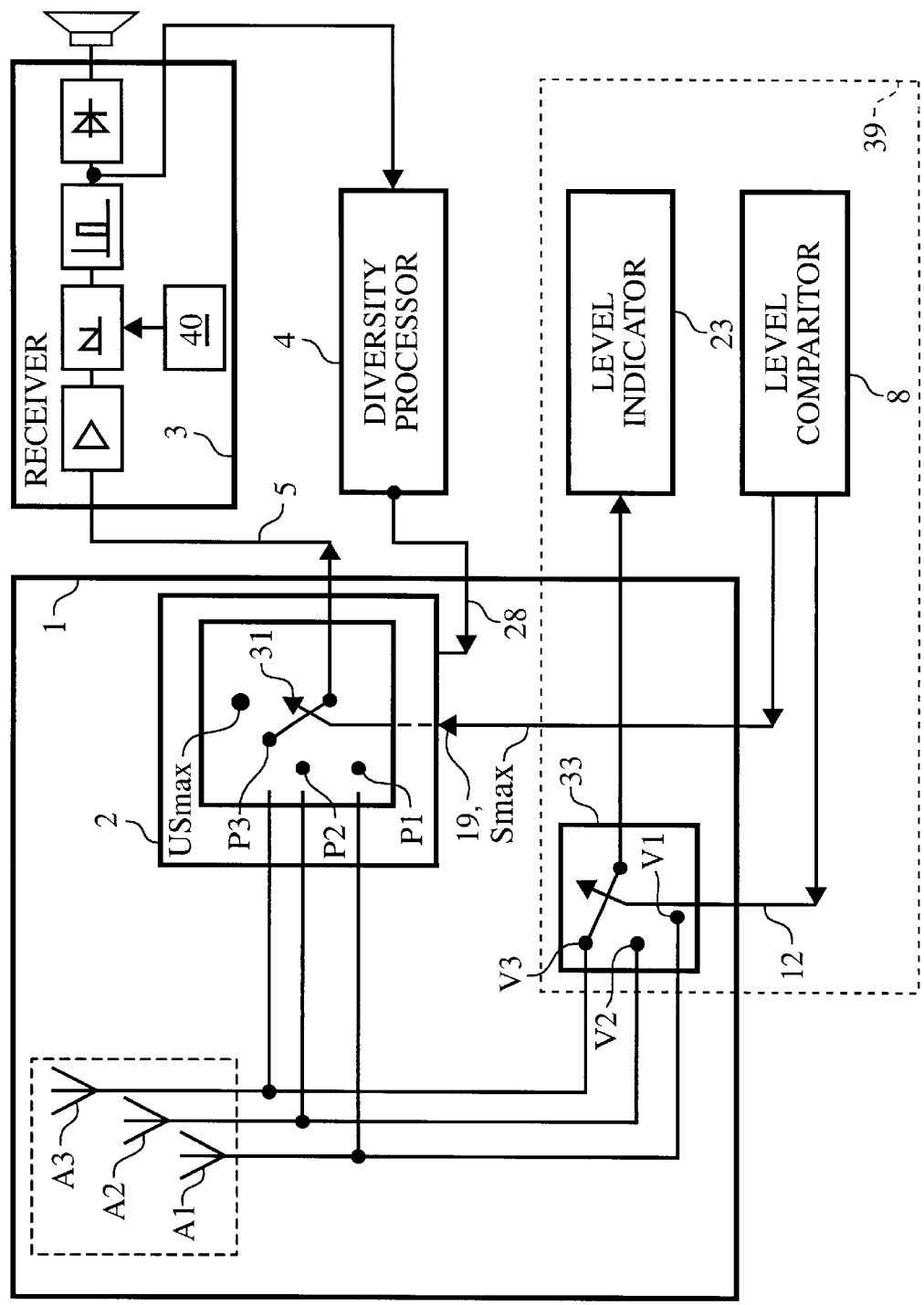
FIG. 1b shows a scanning antenna diversity system similar to FIG. 1a, with the addition of a maximum-level switching mode.

FIG. 1b shows an improved scanning antenna diversity system over the one shown in FIG. 1a, in that the system is expanded by a maximum level switching mode. The switching mode is initiated in the reverse switching position, USmax with the help of a maximum-level indicator 39, consisting of a level comparator switch 33 controlled by the reversing signal 12 from a level indicator 23 and the level comparator device 8, address signals 19 are supplied to logic circuit 2 as the output signal of maximum level indicator 39. For this purpose, antenna signals A1, A2, A3 . . . etc. are supplied to the level comparator switch 33 in parallel at contacts V1, V2 and V3. In the maximum-level switching mode, address signal 19 continually supplies the updated maximum-level switching position (Smax) for switching through a received signal 5 at the maximum level. When an interference occurs in reversing position USmax, and is indicated in diversity processor 4, the system reverses from the maximum-level switching mode back to the cyclic stepping mode. However, as a rule, no cyclic stepping will take place in reversing position USmax since received signal 5 with the highest HF-level is switched through to receiver 3 while the car is driven. Logic circuit 2 represents almost any desired multi-antenna installation 1, supplying at any point in time, a received signal 5 to receiver 3. With different discretely available switching positions P1, P2 . . . , different received signal 5 are available, as known from German Patent DE 44 03 612 and U.S. application Ser. No. 08/803, 239. However, different received signal 5 as in FIG. 1 of German Patent DE 44 03 612, can be formed also from linear combinations of the antenna signals with the help of an antenna matrix 10 in this figure. The advantage of scanning antenna diversity systems of this type is the low cost in using receiver 3, which does not require any multiple tuners for each antenna or similarly any costly accessories, or optional features, but allows at low cost, the formation of a great number of different received signals 5 with the help of different switching positions (P1, P2 . . . ). A preferred diversity processor 4 is the type of processor that has an extremely rapid interference detector. In the past, a processor of type TEA 6101 was found to be extremely efficient for this purpose. This type of processor reacts to interferences with an indication time of about 30 microseconds, which is substantially determined by the intermediate frequency bandwidth of receiver 3.

Figure 2A:
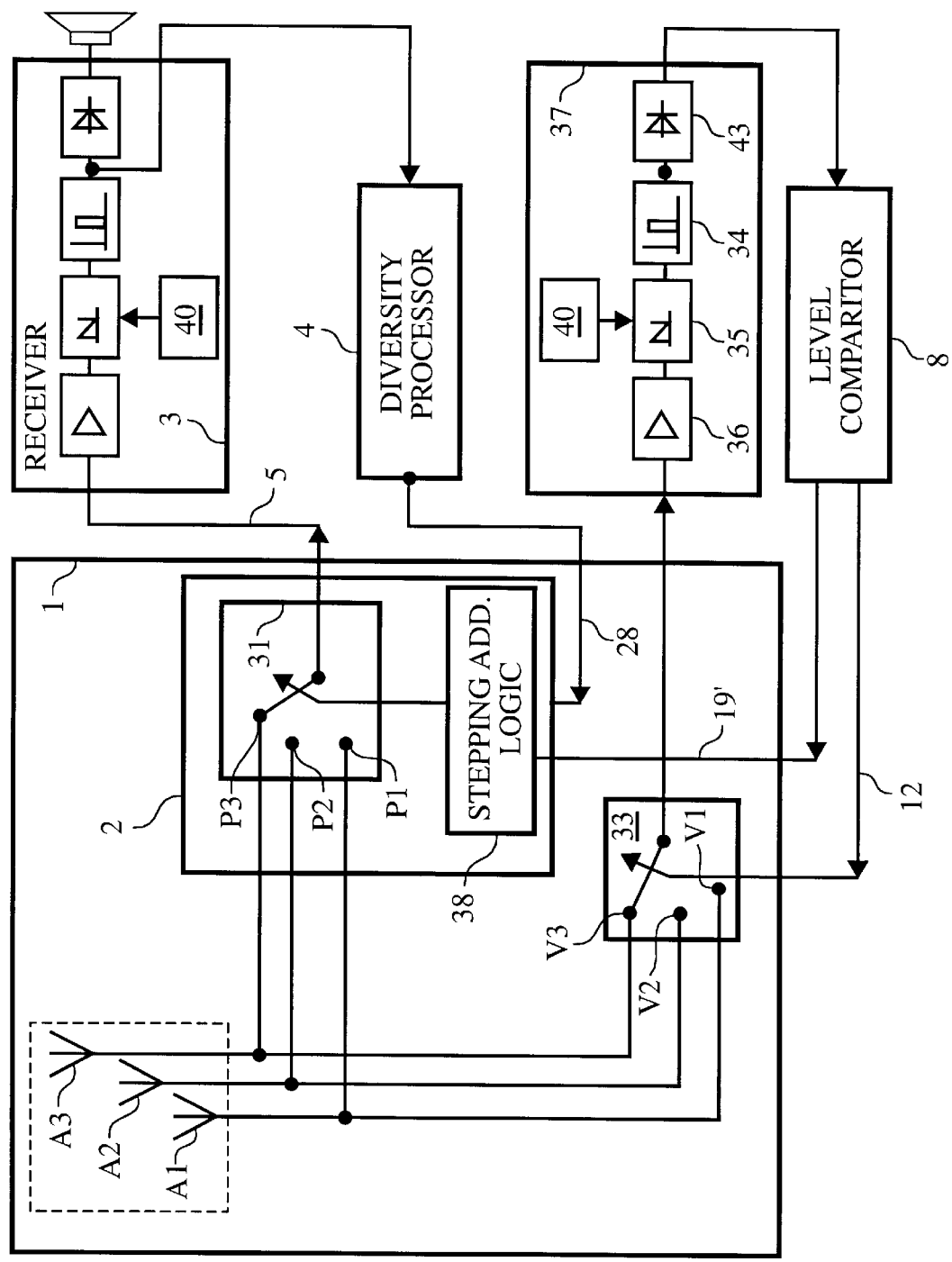
FIG. 2a shows a scanning antenna diversity system with a level comparison tuner as the maximum level indicator.

FIG. 2a shows a scanning antenna diversity system according to the invention, in which level indicator 23 of maximum-level indicator 39 is shown designed in the form of a level comparison tuner 37, and electronic stepping switch 31 is controlled via a stepping address logic circuit 38 receiving stepping pulses 28 from diversity processor 4. The maximum-level switching position (Smax) of level comparator device 8 is supplied to logic circuit 38 through line 19.

Figure 2B:
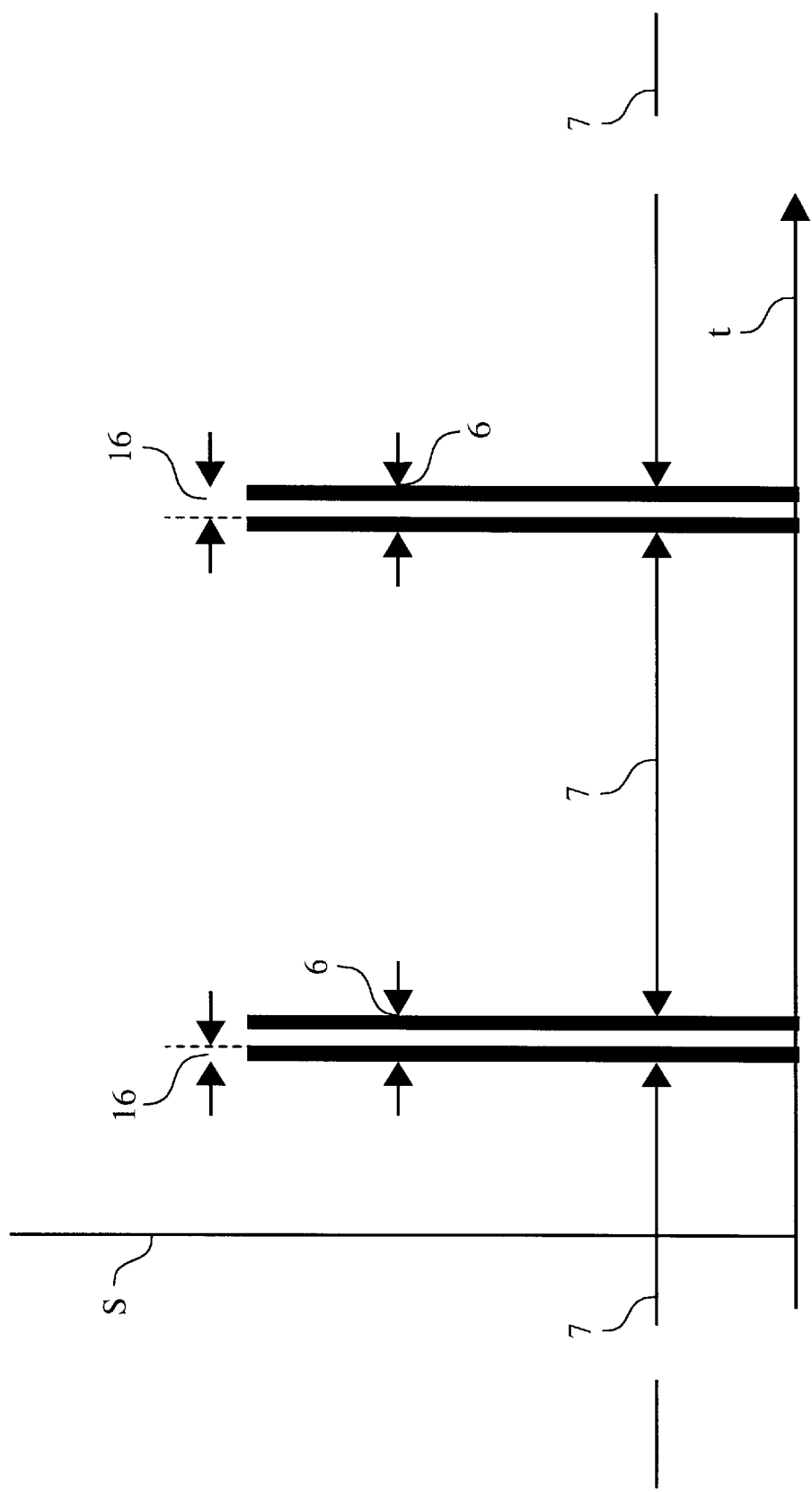
FIG. 2b shows sample pulses of s level comparison for two switching position over a time interval.

FIG. 2b shows sample pulses in,the event of an s level comparison according to two switching positions within level comparison time interval 6 of about twice the time interval of sample time 16 after each time interval 7.

Figure 3:
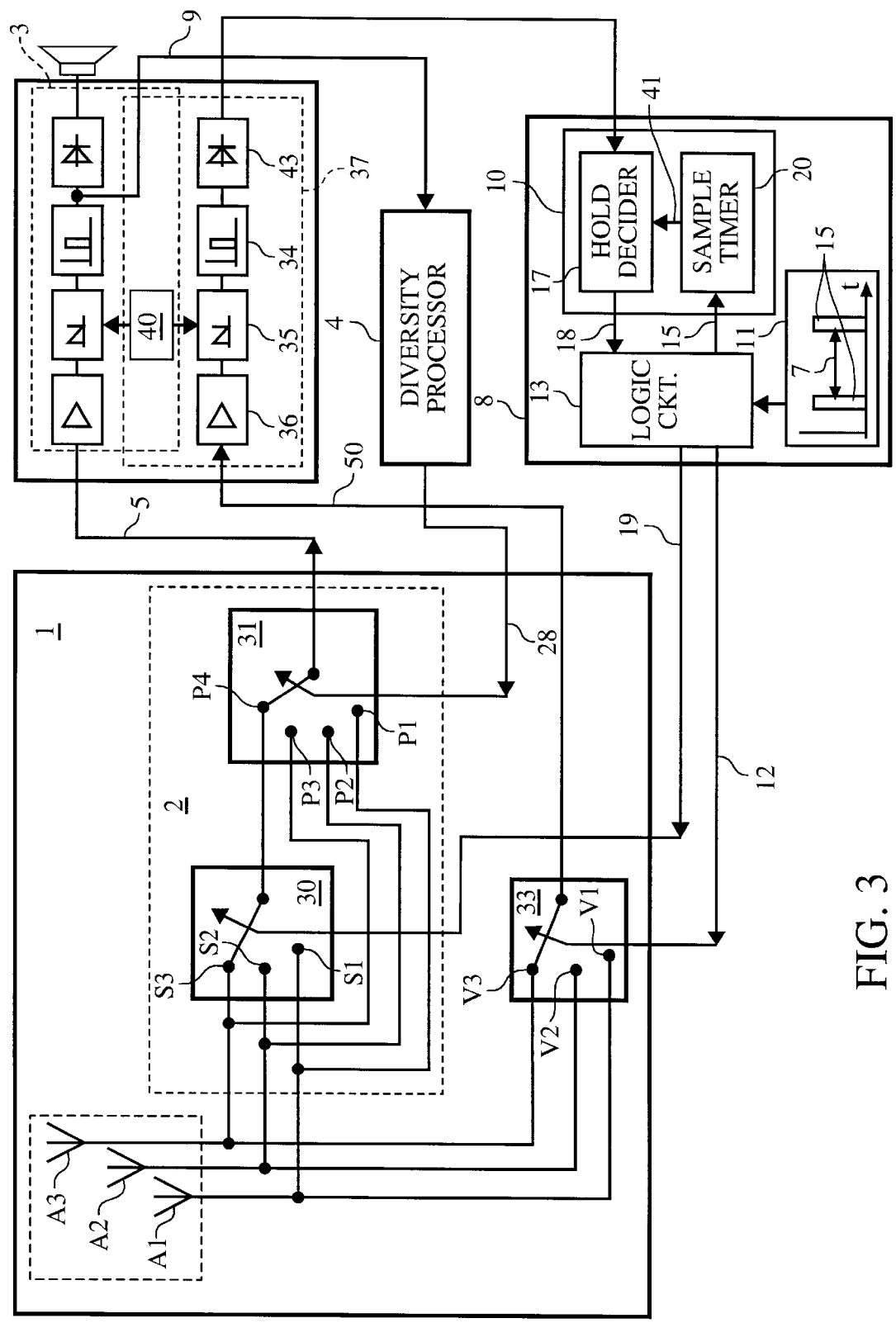
FIG. 3 shows a scanning antenna diversity system wit h a simple logic element.

FIG. 3 shows another embodiment of a scanning antenna a diversity system wherein logic element 2 consists of both an electronic stepping switch 31, and an addressable electronic reversing switch 30, whose inputs P1, P2 . . . and S1, S2 . . . , are connected respectively, in parallel to the RF signals of antennas A1 . . . A3. During the pulse width of level comparison time 6 as shown in FIG. 2b, the maximum-level switching position (Smax) was determined from the possible switching positions S1 . . . S3, adjusted, in each case, for the duration of time interval 7. The output signal of electronic reversing switch 30 was supplied to one of the inputs (in the example, P4=USmax) of electronic stepping switch 31. The discrete signals of antennas A1, A2 and A3 are supplied to the other or remaining inputs (in the example: P1 . . . P3) of electronic stepping switch 31. When an interference is detected in the intermediate-frequency (IF) signal 9 of superhet receiver 3, and inputted to diversity processor 4, steps electronic stepping switch 31 in each case, by one switching position. An antenna signal 50 is supplied to a level comparison RF tuner 37 from level comparison switch 33, the latter being controlled by means of reversing signal 12, and the maximum-level switching position (in the example: Smax=S3) is continually determined in level comparator device 8. Level comparator device 8 is connected via line 19 to reversing switch 30. To reduce costs, the L.O. signal of oscillator 40 is used both in receiver 3 and level comparison RF tuner 37. Tuner 37 has an input amplifies stage 36, a mixer 35, an IF filter 34 and an output detector 43.

The level comparator device 8 in turn consists of a time interval clock or timer 11, which generates the level comparison pulses 15 at periodically recurring time intervals 7. The level comparison pulses 15 are supplied to a sample timer 20 via a logic circuit 13. This sample timer 20 generates the sample and hold pulses 41, which are supplied to a hold decider 17. The sample timer 20 and hold decider 17 supply a binary signal 18 to logic circuit 13, which transmits the maximum-level switching signal 19 (Smax) to antenna switch 30 to allow switch 30 to select the strongest received signal.

Figure 4:
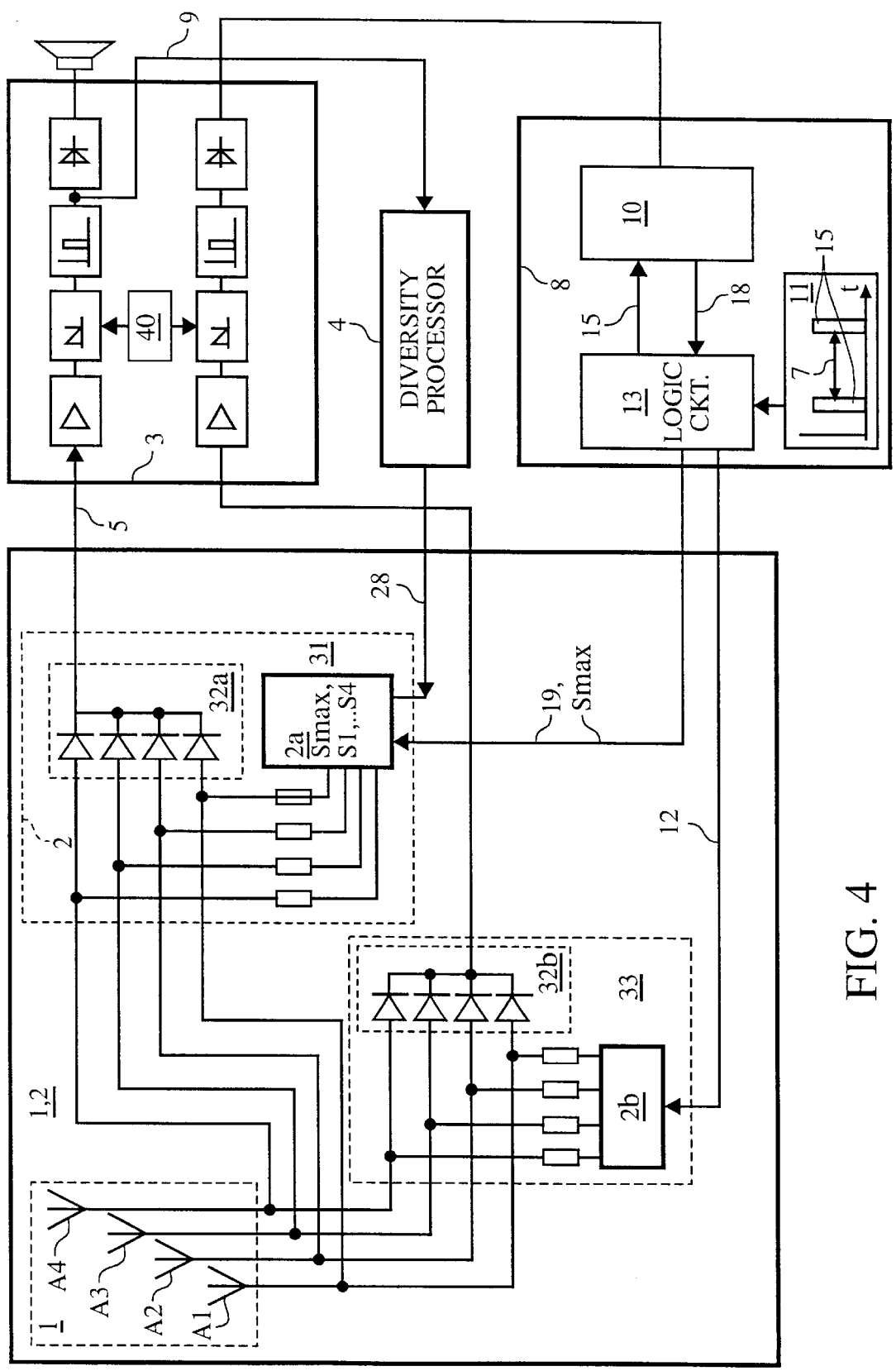
FIG. 4 shows a scanning antenna diversity system with a multi-diode switch.

FIG. 4 shows a further embodiment of a scanning antenna diversity system with a logic element 2 consisting of a multi diode switch 32a and a stepping logic circuit 2a, the logic element 2a representing electronic stepping switch 31. Here, electronic changeover switch 33 consists of a changeover logic circuit 2b and a multi-diode switch 32b. The maximum-level switching mode is initiated by the alternative activation of one of the diodes through changeover logic 2b by changeover signal 12 from logic circuit 13. In this process, the address signal 19 from logic circuit 13 for the maximum-level switching position (Smax) is determined in the interval of level comparison time 6, and the address of the maximum-level switching position (Smax) is updated in stepping logic circuit 2a, in the address list (Smax, S1, S2, S3, or S4) present in the stepping logic circuit 2a in response to address signal 19. In this connection, Smax corresponds to one of the switching positions S1, S2, S3 or S4. If an interference occurs, a stepping pulse 28 is generated during a time interval 7 on the output of diversity processor 4 in response to an IF signal 9. This activates the stepping mode, and the address list is serviced in each case by one further position through activation of the associated diode. Logic circuit 13 can be advantageously designed so that diode switches 32a and 32b will not switch through the same antenna signal at the same time.

Figure 5:
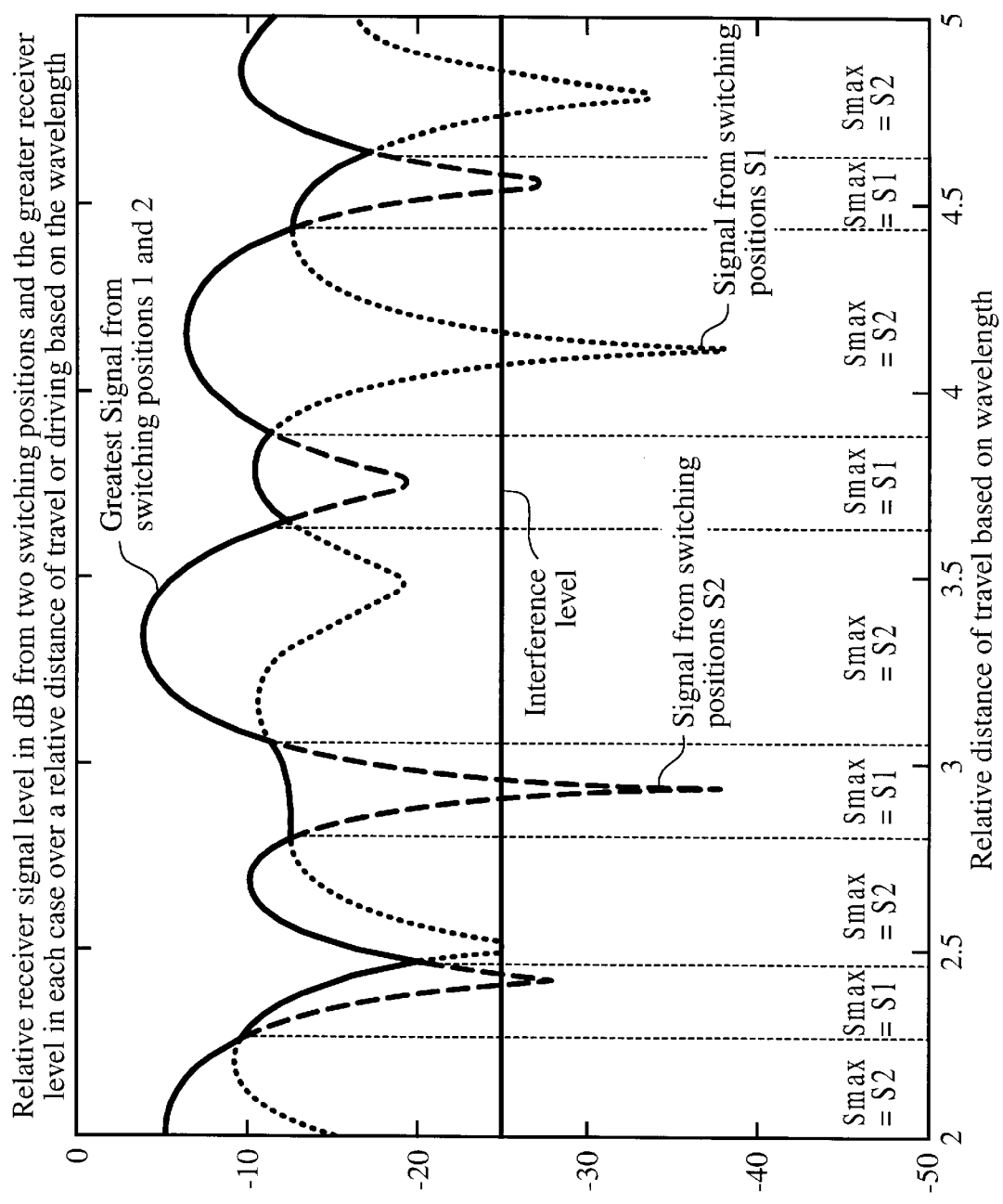
FIG. 5 is a graph which shows the received signal levels from two switching positions, over a travel distance.

FIG. 5 shows the relative received signal level in dB from 2 switching positions and the higher receiver level over a relative displacement distance of travel of the vehicle based on wavelength.

The basic mode of operation of the present invention can be graphically explained with FIG. 5, by looking at the received signal 5 resulting for two different switching positions S1 and S2 over the driven distance, which is based on wavelength λ of the received frequency (f). This is shown for the case of an interference level that is notably below the median value of the two received signal 5. Each of the two received signal 5 has the known level breakdowns caused by the multi-way reception. Without the circuits of the present invention, the diversity processor 4 would, in each case, reverse to the other switching position if the interference spacing were too small for received signal 5 within the range of the level drops of the signal. The consequence thereof is that about 5 reversals take place over the viewed distance of travel under the received conditions shown by way of example in FIG. 2. Now, according to the invention, the greater of the two received signal 5 is additionally made available next to the discretely available switching positions S1, S2 as a separate maximum-level switching position (Smax) after each of the cyclically occurring level comparison processes during the successive time interval 7, with the help of the level comparison device in logic switching circuit 2. In an interference situation as shown in FIG. 5, the greater received signal 5 from switching positions S1, S2 will not trigger any activity in diversity processor 4 because, at each point in time, it is notably above the interference level. The change in the switching positions is shown at the bottom of FIG. 5, wherein the maximum-level switching position (Smax) is formed in the various zones of the distance traveled. The change itself takes place in each case by rapid reversals. In the cyclic test of the received signal 5 according to switching positions S1, S2, Smax during time intervals 7, because of the reduced probability of an occurrence of an interference, diversity processor 4 will, as a rule, remain significantly longer with switching position Smax, than on switching positions S1, S2. This means that the reversing frequency is substantially reduced.

It is assumed in connection with the representation in FIG. 5 that the cyclically recurring time intervals 7 are selected by a number of orders of magnitude shorter than the time duration that the motor vehicle needs in order to travel a distance of half a wavelength of receiving frequency (f), so that time intervals 7 can not be recognized there in FIG. 5. Advantages according to the invention can still be obtained with time intervals 7 where the motor vehicle moves ahead by ⅕ of the wavelength (⅕λ). However, it will be deemed desirable in practice that at least 10 time intervals will be encountered during the movement of the vehicle by half a wavelength (½λ). If v is the driving speed, the following can apply as the standard value for time interval 7=Ti then $$Ti \leq \lambda/(2*10*v).$$

The level comparison time 6=Tp, on the other hand, has to be set substantially smaller than Ti. With the negligibility of the pure reversing times given in practice, the cycle time Tz for the entire process results in $$Tz=Ti.$$

And the cycle frequency in $$fz=1/Tz, \text{ i.e. approximately } 1/Ti.$$

This means that the cycle frequency has to be selected greater than the standard value:

$$fz\min=2*Vkmh*fMHz/100 \text{ in Hz}.$$

In the ultra-short wave frequency range, with fMHz=100, the standard value for the minimal cycle frequency fzmin in Hz thus corresponds with twice the driving speed in km/h.

The invention can be advantageously and with low cost applied to a great number of available switching positions as well. Received signal 5 according to the maximum-level switching position (Smax), because of the continually changing level conditions on the antennas due to multi-way propagation, is obtained by preselection from the multitude of antenna signals constantly alternating with each other. The greater the number of available different switching positions with different received signal 5, the smaller the drops or breakdowns in the curve of the received signal 5 at the maximum-level switching position (Smax). It is important in this connection, especially in reception areas with low to medium signal levels, that diversity processor 4, which operates based on an interference criterion, is at no time blocked, but that the additionally provided maximum-level signal is nonetheless avoided by diversity processor 4 in the event an interference is detected.

The additional advantage obtained with the invention is that the average interference spacing of received signal 5 according to maximum level switching position (Smax) is notably enhanced as well. Due to pre-selection of the maximum-level switching position (Smax) from the available switching positions, the associated received signal 5 follows the break in signal level after a maximum, far less steeply and is, with high frequency replaced with good interference spacing by a more favorable switching position with the updated Smax.

A major advantage of the invention is that the maximum level switching position is found without adding auxiliary signals to received signal 5, or without modulating this signal with an auxiliary signal. Due to the linear distortions occurring during the transmission over the radio path, these signals lead, in some radio receiver situations to undesirable receiver distortions caused by band spreading effects.

Accordingly, while only several embodiments of the present invention have been shown and described, it is obvious that many changes and modifications may be made thereunto without departing from the spirit and scope of the invention.

What is claimed is:

1. A scanning antenna diversity system for motor vehicles comprising:

a) at least two antennas in a multi-antenna installation;
b) a switching logic circuit coupled to said at least two antennas and having a plurality of discrete switching positions and a reversing position USmax;
c) a receiver coupled to said logic circuitry for receiving a received signal from one of said switching positions or said reversing positions USmax;
d) a diversity processor coupled to and controlled by said receiver, said diversity processor producing a derived received signal from said first received signal, said diversity processor cyclically stepping said logic circuitry to another switching position during the presence of reception interference;
e) a maximum level indicator having its input coupled to said at least two antennas and having its output coupled to said controllable logic circuitry, said level indicator sensing the actual level of said antenna signals for continuously comparing the received signals at antennas, and to actuate said logic switching circuit so that during the cyclical through switching of the received signals to receiver and while testing for freedom of interference, said reversing position USmax reverses said received signal to the maximum level switching mode so that when said diversity processor detects the occurrence of an interference, said logic circuit reverses from its maximum level switching position USmax back, to its stepping positions without any audible impairment of reception.

2. The scanning diversity antenna system according to claim 1, wherein said maximum level indicator comprises;
a level comparator switch having switching positions V1, V2, . . . , respectively, coupled to antennas;
a level indicator coupled to the output of level switch; and
a level comparator having its input coupled to said level indicator and producing at its output, both an address signal coupled to logic switching circuit, and a reverse signal coupled to said level switch, so that during short level comparison times, which are periodically initiated and repeated upon expiration of longer time intervals that are preselected with respect to the change in time of the received signal levels due to the movement of the motor vehicle, the signal level of antenna signals in said level indicator, for a series of different switching positions of level comparator switch, are compared so that the maximum-level switching position Smax representing the strongest received signal level is continually determined at the end of level comparison time, and supplied to logic switching circuit as the address signal, the level comparison time being substantially shorter than time interval.

3. The scanning diversity antenna system according to claim 2, wherein time interval is selected sufficiently short so that the motor vehicle will not travel more than the distance $\lambda/5$ during time interval, and that the level comparison time is preferably selected in the microsecond range.

4. The scanning diversity antenna system according to claim 2, wherein said level indicator comprises a superhet level comparison tuner, having a mixer, an IF-filter, and a detector.

5. The scanning diversity antenna system according to claim 4, wherein said tuner is tuned to the same local oscillator as receiver.

6. The scanning diversity antenna system according to claim 5, wherein sharing said same local oscillator provides a uniformity of the received channel in the receiver and in level comparison tuner.

7. The scanning diversity antenna system of claim 3, wherein said level comparator switch 33 initially selects from its switch positions, the strongest signals from respective antennas, during level comparison time, and repeats the selection steps by again sampling switching positions, over a number of time intervals in order to determine the maximum level switching position Smax of switching logic circuit.

8. A scanning antenna diversity system for motor vehicles comprising:
a) at least two antennas in a multi-antenna installation;
b) a switching logic circuit comprising;
an antenna switch having discrete switching positions coupled respectively to antennas;
an addressable electronic reversing switch having discrete switching positions, connected respectively to antennas respectively and a further switch position USmax connected to the output of antenna switch;
c) a receiver coupled to the output of reversing switch for coupling received signal from one of switch positions, or said reversing positions USmax;
d) a diversity processor coupled to and controlled by said receiver, said diversity processor producing a derived received signal from said first received signal, said diversity processor cyclically stepping said logic circuitry to another switching position during the presence of reception interference;
e) a level comparator switch having its switching position, respectively coupled to antennas;
f) a level comparison tuner, coupled to the output of said level comparator switch;
g) a level comparison circuit comprising;
a level comparator coupled to the output of said tuner;
a logic circuit coupled to an output of comparator, and an output coupled to said level switch, for detecting and comparing levels of the antenna signals from antennas, in successive order;
h) an interval timer coupled to logic circuit for generating periodic level comparison pulses over a periodic interval of timer, said pulses triggering said level comparator so as to reverse level comparator switch via a reversing signal within the time width of pulses from logic circuit, wherein the maximum level switching position USmax of switching circuit is stored as an address signal to activate switch, when an interference is detected by diversity processor, the address associated with switch position Smax being continuously updated in logic circuit, so that said address signal activates switching circuit to rapidly switch received signals to receiver without any audible impairment of reception.

9. The scanning diversity antenna system according to claim 8, further comprising a superhet level comparison tuner, having a mixer, an IF-filter, and a detector, said superhet level comparison tuner being tuned to the same local oscillator as receiver.

10. The scanning diversity antenna system according to claim 9, wherein sharing said same local oscillator provides a uniformity of the received channel in the receiver and in level comparison tuner.

11. A scanning antenna diversity system for motor vehicles comprising:
a) at least two antennas in a multi-antenna installation;
b) a switching logic circuit coupled to said at least two antennas; and having discrete switching positions, and a reversing position USmax, and a stepping address logic circuit;
c) a receiver coupled to said logic circuitry for receiving a received signal from one of said switching positions, or said reversing positions USmax;
d) a diversity processor coupled to and controlled by said receiver, said diversity processor producing a derived received signal from said first received signal, said diversity processor coupled to said stepping address logic circuit and processor cyclically stepping said logic circuitry to another switching position during the presence of reception interference;

e) a level comparator switch having a plurality of switching positions coupled respectively to antennas;

f) a lever comparison tuner coupled to the output of switch;

g) a level comparator having its input coupled to said level comparison tuner and producing at its output an address signal coupled to said stepping address logic and a reverse signal coupled to level comparator switch, so that during short level comparison times, which are periodically initiated and repeated upon expiration of longer time intervals that are preselected with respect to the change in time of the received signal levels due to the movement of the motor vehicle, the signal level of antenna signals in the level comparison tuner for a series of different switching positions of level comparator switch are compared so that the maximum-level switching position (Smax) associated with the strongest received signal is continually determined at the end of each level comparison time, and supplied to logical switching element as an address signal, wherein level comparison time is substantially shorter than time interval.

12. The scanning diversity antenna system according to claim 11, wherein said time interval is selected sufficiently short so that the motor vehicle will not travel more than the distance $\lambda/5$ during a time interval, and that the level comparison time is preferably selected in the microsecond range.

13. A scanning antenna diversity system for motor vehicles comprising:

at least two antennas in a multi-antenna installation;

b) a switching logic circuit comprising;

a multiple diode switch, coupled to said antennas, and a stepping logic circuit, having switch positions coupled in parallel to said antennas respectively;

an electronic changeover switch having a changeover logic circuit and a multi-diode switch both coupled to antennas c) a receiver having an input coupled to the output of diode switch;

d) a diversity processor coupled to and controlled by said receiver, said diversity processor producing a derived received signal from said first received signal, said diversity processor cyclically stepping said switching logic circuit;

e) a level comparison tuner having it input, coupled to the output of said changeover switch;

f) a level comparison circuit comprising;

a level comparator coupled to the output of said tuner;

a logic circuit coupled to an output of level comparator, and an interval timer coupled to logic circuit for generating a periodic level comparison pulses, over a periodic interval of time, said pulses triggering said level comparitor through logic circuit, the maximum-level switching Smax being initiated by the activation of changeover logic circuit by changeover signal from logic circuit, and wherein an address signal from logic circuit for the maximum-level switching position (Smax) occurs during the interval of pulsed, so as to reverse changeover switch via a reversing signal within the time width of pulses from logic circuit, wherein the maximum level switching position Smax of switching logic circuit is stored as an address signal to activate switch, when an interference is detected by diversity processor, the address associated with switch position Smax being continuously updated in logic circuit, so that address signal activates switching circuit to rapidly switch received signals to receiver without any audible impairment of reception.

* * * * *